United States Patent
Fukuzawa et al.

(10) Patent No.: US 6,704,147 B2
(45) Date of Patent: Mar. 9, 2004

(54) COLLIMATOR, COLLIMATOR ARRAY AND METHOD OF PRODUCING THOSE MEMBER

(75) Inventors: Takashi Fukuzawa, Osaka (JP); Yoshiro Sato, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 113 days.

(21) Appl. No.: 09/968,841

(22) Filed: Oct. 3, 2001

(65) Prior Publication Data

US 2002/0041448 A1 Apr. 11, 2002

(30) Foreign Application Priority Data

Oct. 5, 2000 (JP) ........................ P2000-306343

(51) Int. Cl.[7] .................. G02B 3/00; G02B 27/10; G02B 7/02; G02B 6/26
(52) U.S. Cl. .................. 359/652; 359/622; 359/819; 385/52
(58) Field of Search ................ 359/641, 710, 359/819, 821, 652, 623, 622, 653; 385/52

(56) References Cited

U.S. PATENT DOCUMENTS

| | | | |
|---|---|---|---|
| 3,658,407 A | * 4/1972 | Kitano et al. ............... 385/116 |
| 3,941,474 A | * 3/1976 | Kitano et al. ............... 385/124 |
| 4,270,047 A | * 5/1981 | Mochizuki et al. ......... 250/216 |
| 4,961,802 A | * 10/1990 | Otsuki et al. ............... 359/819 |
| 5,022,087 A | * 6/1991 | Peppers et al. ............. 382/214 |
| 5,450,157 A | * 9/1995 | Rees .......................... 359/652 |
| 6,172,817 B1 | * 1/2001 | Senapati et al. ............ 359/654 |
| 6,327,096 B1 | * 12/2001 | Tsuchida .................... 359/654 |
| 6,396,980 B1 | * 5/2002 | Liu et al. .................... 385/52 |
| 6,438,290 B1 | * 8/2002 | Bietry et al. ................ 385/33 |
| 6,563,647 B2 | * 5/2003 | Fuzuzawa ................... 359/620 |
| 2002/0031301 A1 | * 3/2002 | Sasaki et al. ................ 385/34 |
| 2002/0063968 A1 | * 5/2002 | Ogi et al. .................... 359/652 |
| 2003/0128437 A1 | * 7/2003 | Sato et al. .................. 359/641 |

OTHER PUBLICATIONS

"Lens Solution Center," Nippon Sheet Glass (NSG) America (nsgamerica.com), no date available.*
"Physica of the SELFOC Lens," Nippon Sheet Glass (NSG) Europe (nsgeurope.com), no date available.*
"Fiber Optic Collimator–Global Market Forecast," ElectroniCast Corporation, 800 South Claremont Street, Suite 105, San Mateo, CA 94402 (electronicast.com), no date available.*

* cited by examiner

Primary Examiner—Evelyn Lester
(74) Attorney, Agent, or Firm—Whitham, Curtis & Christofferson, P.C.

(57) ABSTRACT

A method of producing a collimator or collimator array is constituted by the steps of: fixing long-size gradient index rod lens raw materials on a substrate having end surfaces each forming a plane so that the long-size gradient index rod lens raw materials are arranged side by side at intervals of the predetermined pitch while optical axes of the gradient index rod lens raw materials are parallel to one of the end surfaces of the substrate; cutting the substrate provided with the gradient index rod lens raw materials at a predetermined position in a plane perpendicular to the optical axes of the gradient index rod lens raw materials to thereby divide the substrate provided with the gradient index rod lens raw materials into lens array parts; adjusting the divided lens array parts so that each of the gradient index rod lens raw materials in the lens array parts has a defined lens length; and arranging the lens array parts so that the cut end surfaces of the lens array parts are made to face each other while optical axes of the lens parts facing each other correspondingly are made coincident with each other.

17 Claims, 5 Drawing Sheets

COLLIMATOR, COLLIMATOR ARRAY AND METHOD OF PRODUCING THOSE MEMBER

BACKGROUND OF THE INVENTION

The present invention relates to a collimator constituted by a pair of gradient index rod lenses arranged to face each other, a collimator array in which such collimators are arranged side by side at intervals of a predetermined pitch, and a method of producing those collimator and collimator array. Particularly it relates to a technique for simplifying the step of optical alignment to thereby obtain products having high performance.

In optical information transmission, there is heretofore used an optical system in which: divergent beam emitted from one optical fiber is collimated by one lens to thereby generate collimated beam; and the collimated beam is propagated and then condensed by the other lens to thereby make the condensed beam enter the other optical fiber. Such an optical system is called "collimator". Various kinds of optical elements such as a filter, an optical isolator, an optical switch, a beam modulator, and soon, can be put between the two lenses to thereby form a diversity of optical modules.

In the above optical system, convex lenses are used as the aforementioned lenses. A collimator using gradient index rod lenses are also used. Such a gradient index rod lens has characteristic that the refractive index changes gradially in a radial direction with the axial line as its center. When the lens length of the gradient index rod lens and the distance between the lens and the optical fiber are defined in accordance with the wavelength of beam, the beam incident on the lens can be collimated or condensed by the lens so that the collimated or condensed beam can be made exit out of the lens.

FIG. 5 is a perspective view showing a single-core collimator having a pair of gradient index rod lenses 1a arranged with respective one ends facing each other. Optical fibers 4 are connected to the respective other end surfaces which are opposite to the one facing end surfaces of the gradient index rod lenses 1a. The optical axes of the optical fibers 4 are made coincident with the optical axes of the gradient index rod lenses 1a respectively. The beam from one optical fiber 4 is collimated by the gradient index rod lens 1a connected to the one optical fiber 4 to thereby generate collimated beam. The collimated beam is condensed by the other gradient index rod lens 1a and led to the other optical fiber 4 connected thereto. In this manner, an optical signal is transmitted. Therefore, in a collimator using such gradient index rod lenses 1a, the optical axes of the gradient index rod lenses 1a, 1a facing each other need to be made coincident with each other and, the optical axis of each of the gradient index rod lenses 1a needs to be made coincident with the optical axis of a corresponding optical fiber 4 accurately so as to reduce coupling loss.

However, as shown in FIGS. 6(a) and 6(b), axis displacement in various directions, generally, occurs when the gradient index rod lenses 1a, 1a are arranged so as to face each other. FIG. 6(a) is a plan view of the collimator depicted in FIG. 5 from the gradient index rod lens 1a side. FIG. 6(b) is a side view of the collimator. As shown also in FIG. 5, the reference character C designates an ideal optical axis common to the gradient index rod lenses 1a and the optical fibers 4. A direction parallel to the optical axis C is defined as a Z-direction. The direction perpendicular to the horizontal direction C is defined as an X-direction. A-vertical direction perpendicular to the. X- and Z-directions is defined as a Y-direction.

As axis displacement between the lenses facing each other, displacement in the X- and Z-directions and inclination θx in the X-direction may be supposed to occur as shown in FIG. 6(a) and displacement in the Y- and Z-direction and inclination θy in the Y-direction may be supposed to occur as shown in FIG. 6(b). Therefore, optical alignment of four axes is required for forming a pair of lenses. In the case of a collimator array, because a lens array which has been already fixed on one side needs to be subjected to optical alignment, rotation θz around the optical axis C as shown in FIG. 6(a) is further added. That is, in a collimator array, optical alignment of six axes needs to be repeated for the respective lens elements 1a, 1a.

As described above, in the background art, complex and delicate optical alignment work is required in multiaxial directions between the gradient index rod lenses 1a, 1a. Particularly in a collimator array, the optical alignment work must be repeated by a plurality of times, so that the optical alignment work is very difficult.

SUMMARY OF THE INVENTION

The present invention is devised upon such circumstances and an object of the invention is to provide a collimator or collimator array in which the number of axes to be optically aligned between gradient index rod lenses is reduced, and a method of producing such a collimator or collimator array.

In order to achieve the above object, according to the present invention, there is provided a collimator constituted by a pair of gradient index rod lenses arranged to face each other, wherein; the pair of gradient index rod lenses are fixed respectively on a pair of substrates each having end surfaces forming planes so that an optical axis of each gradient index rod lens is parallel to one of the end surfaces of corresponding one of the substrates; and the pair of substrates are arranged to face each other while the end surfaces of the substrates are kept parallel to each other respectively and correspondingly. Further, there is provided a collimator array constituted by a pair of rod lens arrays arranged to face each other, each of the rod lens arrays including gradient index rod lenses arranged side by side at intervals of a predetermined pitch, wherein: the gradient index rod lenses in each of the rod lens arrays are fixed on corresponding one of a pair of substrates having end surfaces each forming a plane so that optical axes of the gradient index rod lenses are arranged at intervals of the predetermined pitch and parallel to one of the end surfaces of the corresponding substrate; and the pair of substrates are arranged to face each other while the end surfaces of the substrates are kept parallel to each other.

In order to achieve the above object, according to the present invention, there is provided a method of producing a collimator having a pair of gradient index rod lenses arranged to face each other, constituted by the steps of: fixing a long-size gradient index rod lens raw material on a substrate having end surfaces each forming a plane so that an optical axis of the gradient index rod lens raw material is parallel to one of the end surfaces of the substrate; cutting the substrate provided with the gradient index rod lens raw material at a predetermined position in a plane perpendicular to the optical axis of the gradient index rod lens raw material to thereby divide the substrate provided with the gradient index rod lens raw material into two lens parts; adjusting the lens parts to make each of the lens parts have a defined lens length; and arranging the two lens parts so that the cut end surfaces of the lens parts are made to face each other while optical axes of the two lenses are made coincident with each other.

Further, in the method of producing a collimator, the pair of substrates after cutting are made to face each other while end surfaces of the substrates are kept parallel to each other respectively to thereby make the optical axes of the pair of lenses coincident with each other.

In order to achieve the above object, according to the present invention, there is provided a method of producing a collimator array having a pair of rod lens arrays arranged to face each other, each of the rod lens arrays having gradient index rod lenses arranged side by side at intervals of a predetermined pitch, constituted by the steps of: fixing long-size gradient index rod lens raw materials on a substrate having end surfaces each forming a plane so that the long-size gradient index rod lens raw materials are arranged side by side at intervals of the predetermined pitch while optical axes of the gradient index rod lens raw materials are parallel to one of the end surfaces of the substrate; cutting the substrate provided with the gradient index rod lens raw materials at a predetermined position in a plane perpendicular to the optical axes of the gradient index rod lens raw materials to thereby divide the substrate provided with the gradient index rod lens raw materials into lens array parts; adjusting the divided lens array parts so that each of the gradient index rod lens raw materials in the lens array parts has a defined lens length; and arranging the lens array parts so that the cut end surfaces of the lens array parts are made to face each other while optical axes of the lens parts facing each other correspondingly are made coincident with each other.

Further, in the method of producing a collimator array, the pair of substrates after cutting are arranged to face each other while end surfaces of the substrates are kept parallel to each other respectively to thereby make optical axes of at least one pair of facing lenses coincident with each other.

The present disclosure relates to the subject matter contained in Japanese patent application No. 2000-306343 (filed on Oct. 5, 2000), which is expressly incorporated herein by reference in its entirety.

DESCRIPTION OF THE PREFERRED EMBODIMENT

A preferred embodiment of the present invention will be described below in detail with reference to accompanying drawings.

Figure 1:
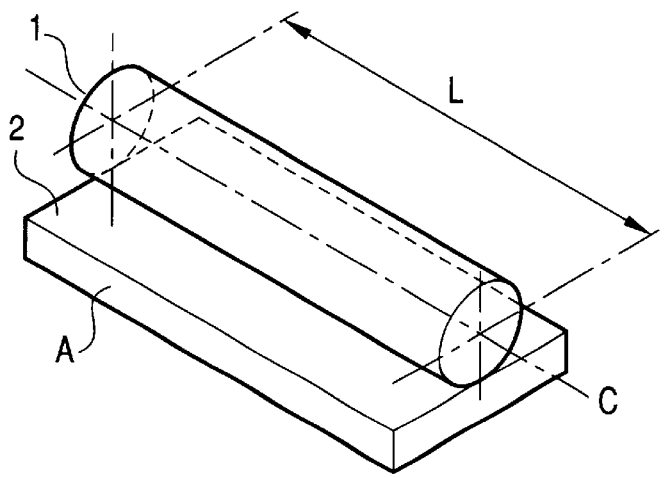
FIGS. 1(a) to 1(c) are perspective views showing a procedure of producing a collimator according to the present invention.
Figure 1:
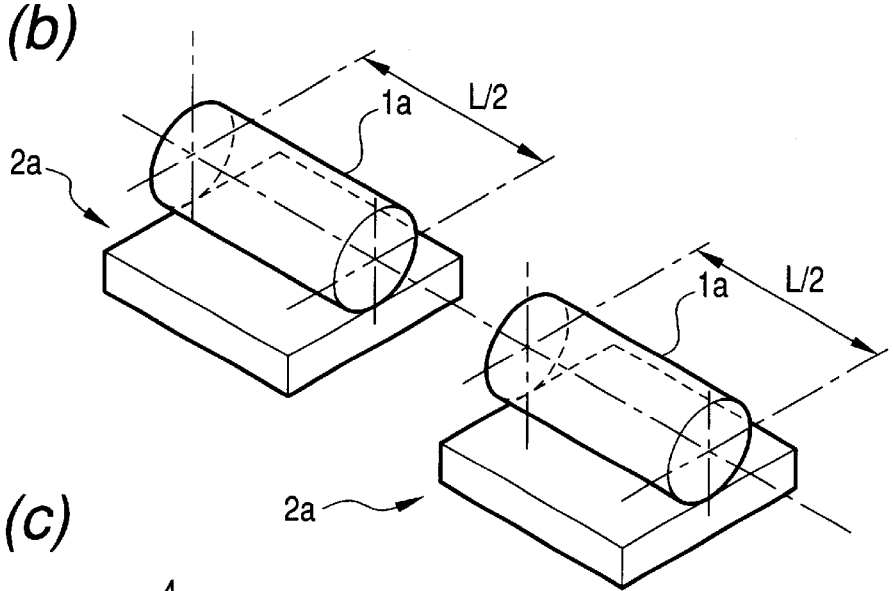
Figure 1:
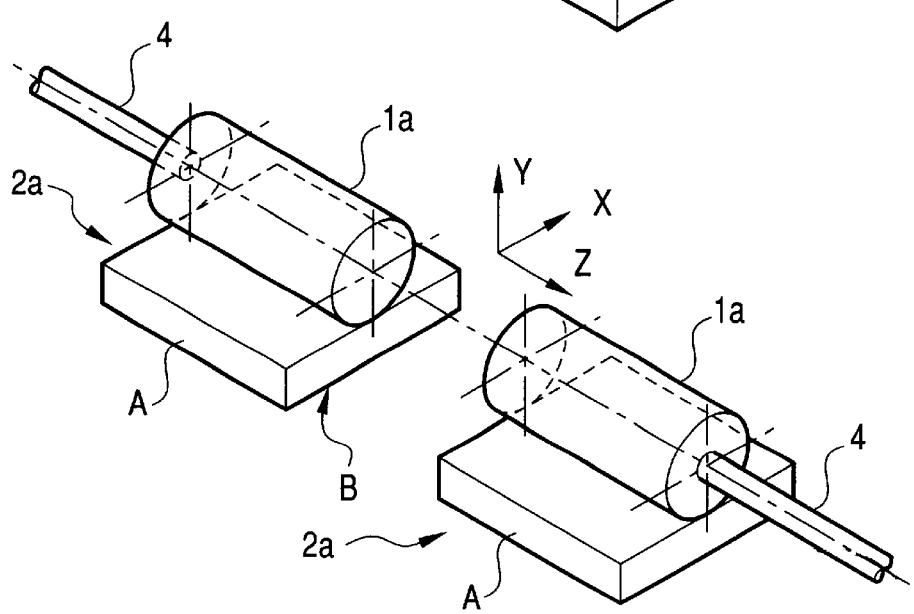

FIGS. 1(a) to 1(c) are perspective views showing a procedure of producing a collimator according to the present invention. First, as shown in FIG. 1(a), a long-size gradient index rod lens raw material 1 is fixed onto a planar substrate 2 with a side surface A (parallel to an y-z plane) as a plane. The gradient index rod lens raw material 1 has a lens length (L) not smaller than at least twice as large as the lens length (hereinafter referred to as "defined lens length") of a gradient index rod lens 1a which is a final product. In fixation, the gradient index rod lens raw material 1 is positioned so that the optical axis C of the gradient index rod lens raw material 1 is parallel to the side surface A of the substrate 2.

Figure 2:
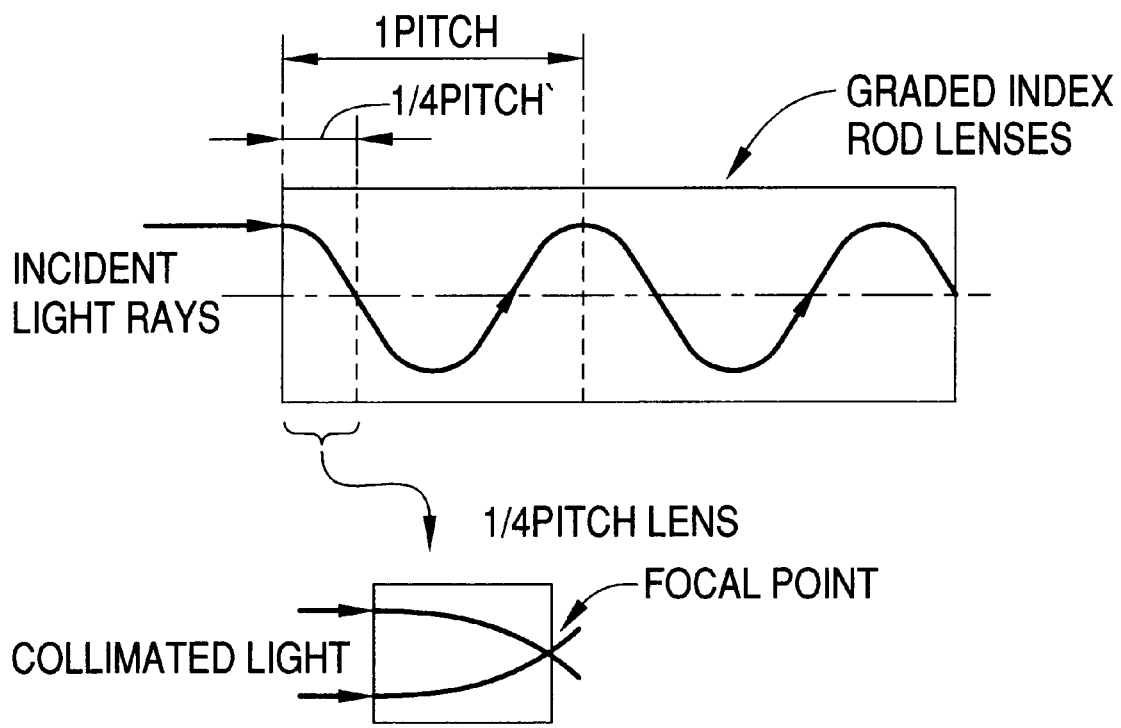
FIG. 2 is an explanatory graph showing a state of propagation of beam in the inside and end surfaces of a gradient index rod lens.

FIG. 2 is a graph showing a state in which beam propagates in the inside of a gradient index rod lens and exits from an end surface thereof. In the collimator, the lens length of each gradient index rod lens is defined to be ¼ as large as the pitch P so that beam with the maximum amplitude can exit from the end surface of the gradient index rod lens. Therefore, the lens length (L) of the gradient index rod lens raw material 1 is set to be not smaller than twice as large as the sum of the defined lens length (P/4), the width (corresponding to the width of a cutting blade) of a tab for cutting in a cutting step which will be described later, and the width of a tab for polishing cut surfaces. Incidentally, the case where the lens length (L) of the gradient index rod lens raw material 1 is set to be twice as large as the defined lens length will be described hereunder by way of example for convenience' sake of description.

Then, as shown in FIG. 1(b), the substrate 2 provided with the gradient index rod lens raw material 1 is cut in a position of the just half length of the gradient index rod lens raw material 1 on a plane perpendicular to the optical axis C so as to be divided into two. Incidentally, a diamond cutter or the like can be used as a cutting tool. In setting of the lens length (L) of the gradient index rod lens raw material 1, a width of cutting corresponding to the width of a blade of the cutting tool used is included in advance as described above.

After cutting, cut surfaces of gradient index rod lenses 1a obtained by halving the raw material 1 are polished so that the lens length of each of the lenses 1a is adjusted to the defined lens length while end surface of the lenses 1a are smoothened. Therefore, in setting of the lens length (L) of the gradient index rod lens raw material 1, a width of polishing corresponding to the quantity of polishing is included in advance.

As shown in FIG. 1(b), a pair of gradient index rod lenses 1a which can be arranged to face each other to form a collimator are obtained at once by the cutting and polishing steps. In general production of a collimator, a pair of lenses are desirably selected from a large number of gradient index rod lenses 1a which are produced by cutting a long-size gradient index rod lens raw material 1 into a predetermined lens length.

Figure 6:
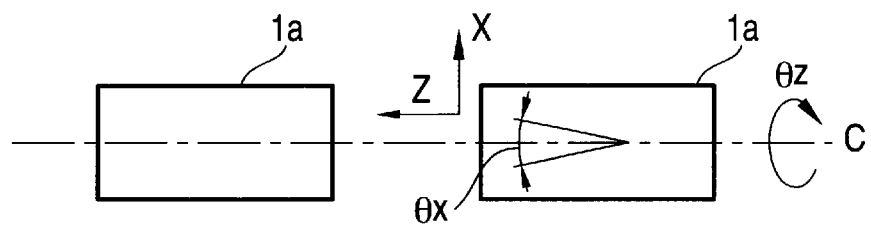
FIGS. 6(a) and 6(b) are plan and side views for explaining the axis displacement between gradient index rod lenses in the collimator.
Figure 6:
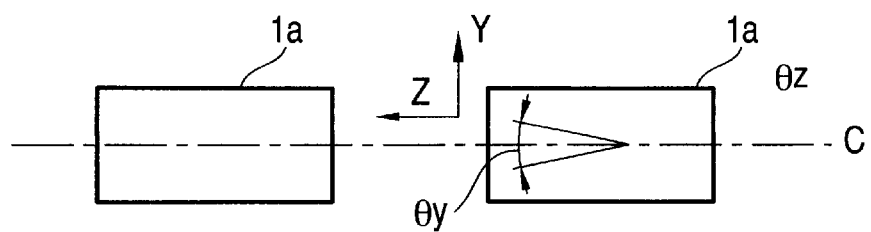

On the contrary, in the method according to the present invention, if angle displacement occurs when the gradient index rod lens raw material 1 is cut, such angle displacement occurs equally in end surfaces of the pair of gradient index rod lenses 1a so that the angle displacement remains in the final product. As a result, beam transmitted through the pair of gradient index rod lenses 1a respectively are parallelly displaced in the X- or Y-direction in a propagation space. Hence, angle adjustment by θx and θy as shown in FIGS. 6(a) and 6(b) is not required if bottom surfaces B (parallel to the x-zplane) of the two substrates 2a, 2a after the cutting can be kept parallel to each other and side surfaces A (parallel to the y-z plane) of the two substrates 2a, 2a can be kept parallel to each other. That is, the number of axes to be adjusted can be reduced from five in the background art to three in the present intention so that such optical alignment work can be simplified greatly. Incidentally, there is the case where the rear end surface of each gradient index rod lens 1a is processed obliquely to prevent beam from being reflected on the lens end surface when beam is made incident on the gradient index rod lens 1a in the condition that an optical fiber is connected to the rear end surface of the gradient index rod lens 1a. In this case, the incident beam is parallel to the center axis of the gradient index rod lens 1a but beam made to exit from the gradient index rod lens 1a is not parallel to the center axis Therefore, on this occasion, angle adjustment by θy as shown in FIG. 6(b) is required but angle adjustment by θx as shown in FIG. 6(a) is not required.

Then, as shown in FIG. 1(c), the collimator according to the present invention is completed by arranging the pair of gradient index rod lenses 1a, 1a in such a manner that the cut end surfaces of thereof face each other while optical fibers 4, 4 are connected to the other end surfaces respectively so that the. optical axes of the optical fibers 4, 4 are made coincident with each other Incidentally, the method of connecting the gradient index rod lens 1a and the optical fiber 4 to each other is not particularly limited. Though not shown, there may be used, for example, a method in which: the optical fiber 4 is inserted through a capillary having the same diameter as that of the gradient index rod lens 1a; the capillary is fixed onto a substrate having the same thickness as that of the substrate 2a of the gradient index rod lens 1a; and the gradient index rod lens 1a and the optical fiber 4 are arranged to face each other.

Figure 3:
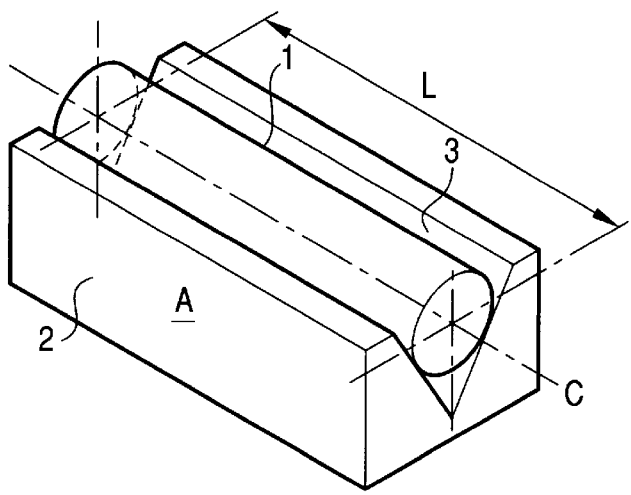
FIGS. 3(a) to 3(c) are perspective views showing another example (using a V groove substrate) of the procedure of producing a collimator according to the present invention.
Figure 3:
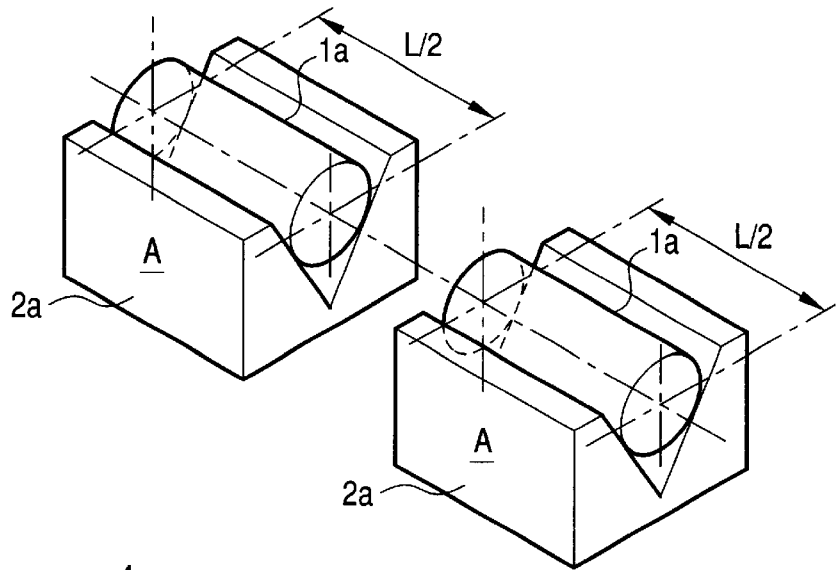
Figure 3:
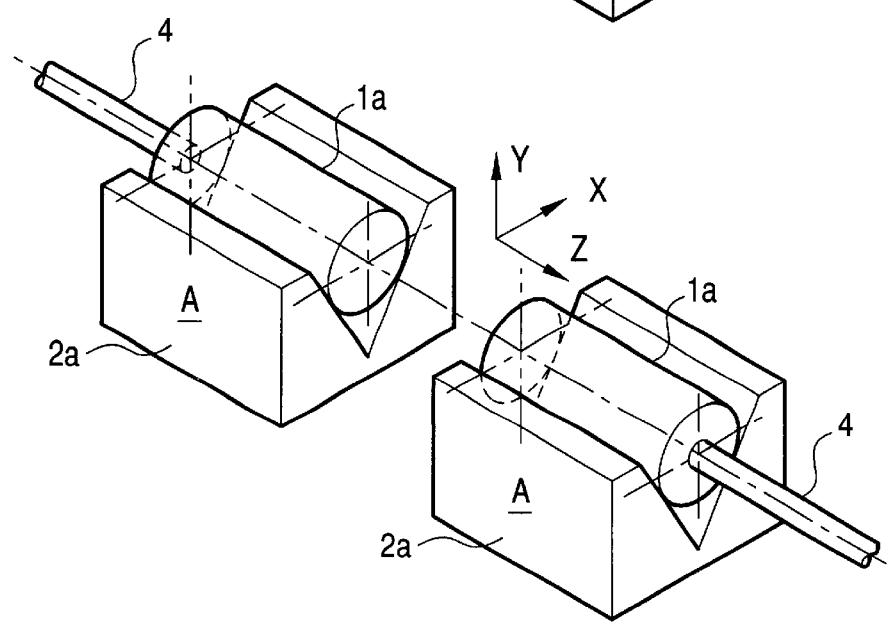

In the above description, a substrate having a V groove may be also used. That is, as shown in FIG. 3(a), a substrate 2 having a V groove 3 with a predetermined opening groove width and a predetermined inclination angle is used so that the gradient index rod lens raw material 1 is received in the V groove 3. The ridgeline of the V groove 3 is formed in parallel to the side surface A of the substrate 2. Hence, at the same time that the gradient index rod lens raw material 1 is received in the V groove 3, the optical axis C of the rod lens raw material 1 is kept parallel to the side surface A of the substrate 2. Then, as shown in FIG. 3(b), the substrate 2 with the gradient index rod lens raw material 1 is cut in a position of the just half length of the gradient index rod lens raw material 1 in a plane perpendicular to the optical axis C so as to be divided into two. After the cutting the cut surfaces of the two gradient index rod lenses 1a, 1a obtained by dividing the rod lens raw material 1 into two are polished so that the lens length of each of the gradient index rod lenses 1a, 1a is adjusted to a defined lens length while the cut end surfaces are smoothened. Then, as shown in FIG. 3(c), the pair of gradient index rod lenses 1a, 1a are arranged so that the cut end surfaces thereof face each other while optical fibers 4, 4 are connected to the other end surfaces so that the optical axes of the optical fibers 4 are made coincident with each other. Thus, the collimator is completed.

Although the above description has been made about the case where a V groove 3 is provided in the substrate 2 so as to serve as a groove for receiving the gradient index rod lens raw material 1, the present invention is not limited thereto but may be applied also to the case where a sectional semicircular groove or a U groove is provided in the substrate 2.

Figure 4:
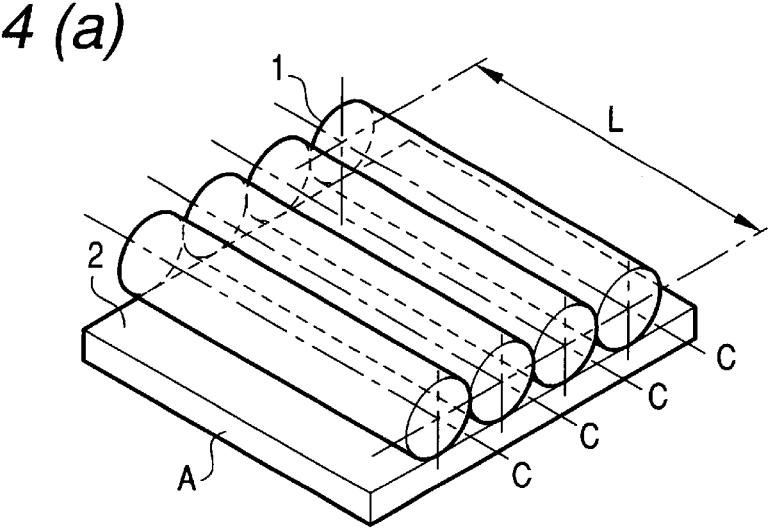
FIGS. 4(a) to 4(c) are perspective views showing a procedure of producing a collimator array according to the present invention.
Figure 4:
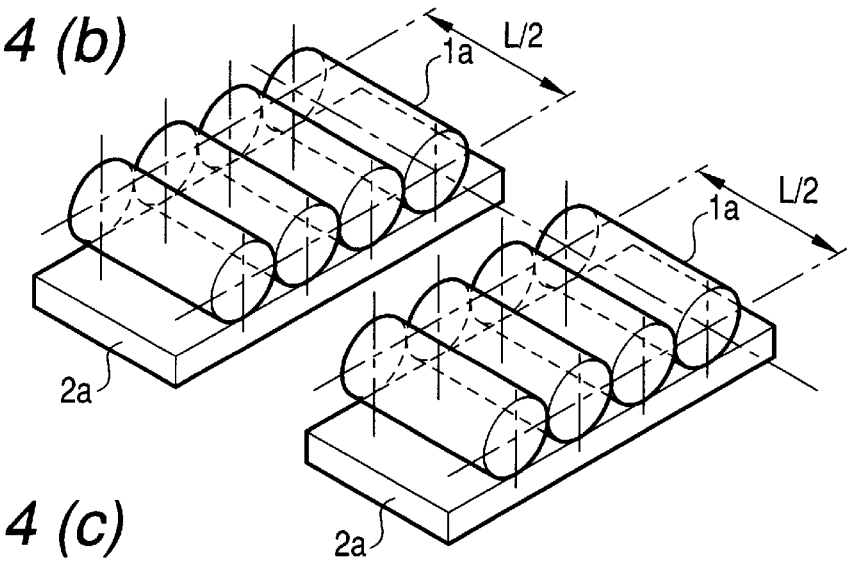
Figure 4:
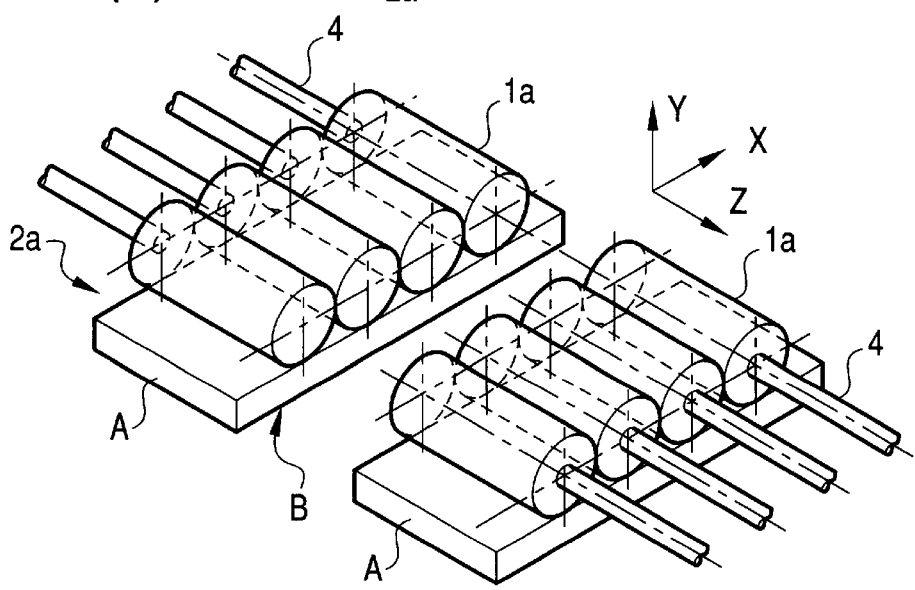
Figure 5:
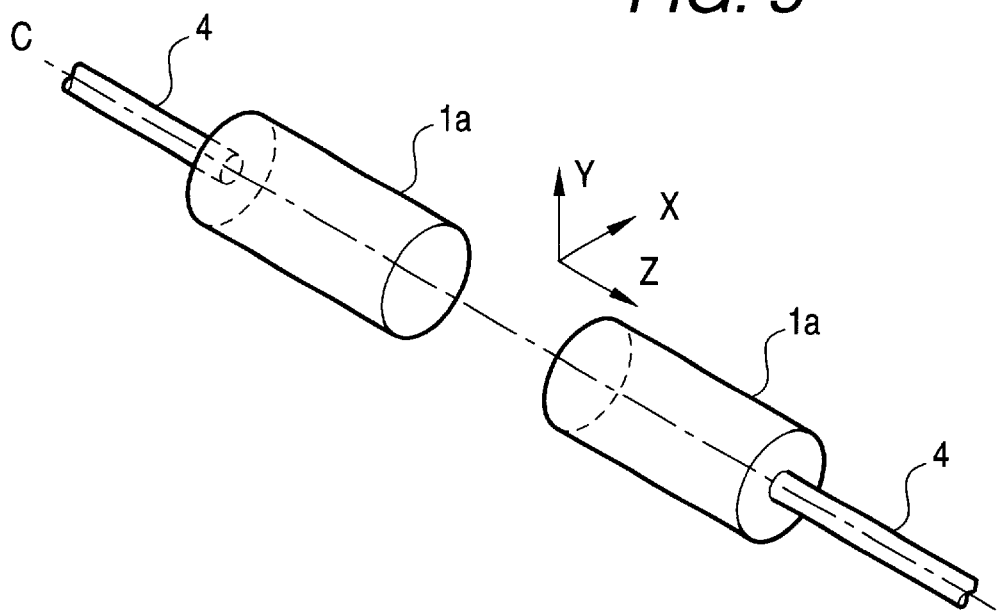
FIG. 5 is a perspective view showing a background-art collimator.

Each of the aforementioned producing methods may be applied also to the production of a collimator array as shown in FIGS. 4(a) to 4(c). First, as shown in FIG. 4(a), a plurality (for examples four in FIG. 4(a)) of long-size gradient index rod lens raw materials 1 are arranged at intervals of a predetermined distance and fixed onto a planar substrate 2 with a side surface A as a plane. On this occasion, the respective gradient index rod lens raw materials 1 are positioned so as to be parallel to the side surface A of the substrate 2. Then, as shown in FIG. 4(b), the substrate 2 with the gradient index rod lens raw materials 1 is cut in a position of the just half length of each of the gradient index rod lens raw materials 1 in a plane perpendicular to each optical axis C so as to be divided into two. After the cutting, the cut surfaces of the gradient index rod lenses 1a obtained by dividing the substrate 2 into two are polished so that the lens length of each to the rod lenses 1a is adjusted to a defined lens length while end surfaces of the rod lenses 1a are smoothened. A pair of gradient index rod lens 1a arrays facing each other to form a collimator array are obtained at once by the cutting and polishing steps. Then, as shown in FIG. 4(c), optical fibers 4 are connected to the gradient index rod lenses 1a respectively while the optical axes of the optical fibers 4 are coincident with the optical axes of the gradient index rod lenses 1a respectively. Thus, the collimator array is completed.

According to the aforementioned producing method, there can be obtained a collimator array constituted by a combination of pairs of gradient index rod lenses and pairs of optical fibers with optical axes of the lenses coincident with the optical axes of the fibers respectively. Moreover, neither inclination (θx) in the X-Z plane nor inclination (θy) in the Y-Z plane occurs. Moreover, the positional relations between the lenses are fixed. The optical alignment work can be trade easily if the bottom surfaces B of the pair of substrates 2a are kept parallel to each other and if the side surfaces A of the pair of substrates 2a are kept parallel to each other. That is, the optical alignment work can be made easily if three optical axes X, Y and Z per one lens element can be positioned. In this manner, the optical alignment work can be simplified greatly compared with the background art.

As is obvious from the above description, in accordance with the present invention, the angles between the gradient index rod lenses need not be adjusted, so that the optical alignment work can be simplified. Hence, a collimator or a collimator array little in connection loss can be obtained by the simple producing steps and without necessity of any special apparatus and work.

What is claimed is:

1. A collimator comprising a pair of gradient index rod lenses facing each other, wherein:

said pair of gradient index rod lenses are fixed respectively on a pair of substrates each having a reference surface so that an optical axis of each gradient index rod lens is parallel to said reference surface of corresponding one of the substrates, with the rod lens fixed to the substrate at a side circumferential surface of the rod lens; and said paired substrates face each other while said reference surfaces of said substrates are parallel to each other respectively and correspondingly.

2. A collimator array comprising a pair of rod lens arrays facing each other, each of said rod lens arrays including gradient index rod lenses arranged side by side at intervals of a predetermined pitch, wherein:

said gradient index rod lenses in each of said rod lens arrays are fixed on corresponding one of a pair of substrates having reference surfaces so that optical axes of said gradient index rod lenses are at intervals of said predetermined pitch and parallel to said reference surface of corresponding one of the substrates; and said paired substrates face each other while said reference surfaces of said substrates are parallel to each other.

3. A method of producing an optical device, comprising the steps of:

preparing a substrate having a first reference surface;

fixing at least one gradient index rod lens onto a surface of the substrate other than the reference surface;

cutting the substrate together with the gradient index rod lens to provide at least two optical parts each having a divided substrate and at least one divided gradient index rod lens fixed thereon; and positioning the optical parts so that the reference plane of one of the divided substrate has a predetermined positional relationship with respect to the reference plane of the other of the divided substrate, thereby aligning an optical axis of the gradient index rod lens fixed on the divided substrate with an optical axis of the gradient index rod lens fixed on the other divided substrate.

4. A method of producing an optical device according to claim 3, wherein the optical device is a collimator.

5. A method of producing an optical device according to claim 3, wherein the optical device is a collimator array.

6. A method of producing an optical device according to claim 3, wherein the surface onto which the at least one gradient index rod lens is fixed is parallel to the reference plane.

7. A method of producing an optical device according to claim 3, wherein the surface onto which the at least one gradient index rod lens is fixed is perpendicular to the reference plane.

8. A method of producing an optical device according to claim 3, wherein in the step of fixing, the at least one gradient index rod lens is fixed onto the surface of the substrate so that an optical axis of the gradient index rod lens is parallel to the reference plane.

9. A method of producing an optical device according to claim 3, wherein in the step of fixing, the at least one gradient index rod lens is fixed onto the surface of the substrate so that an optical axis of the gradient index rod lens is perpendicular to the reference plane.

10. A method of producing an optical device according to claim 3, wherein the at least one gradient index rod lens includes a single gradient index rod lens.

11. A method of producing an optical device according to claim 3, wherein the at least one gradient index rod lens includes a plurality of gradient index rod lenses.

12. A method of producing an optical device according to claim 3, wherein in the step of cutting, the substrate and the gradient index rod lens are cut in a direction perpendicular to an optical axis of the gradient index rod lens.

13. A method of producing an optical device according to claim 3, wherein each of the divided gradient index rod lenses on the divided substrates has a predetermined length.

14. A method of producing an optical device according to claim 3, further comprising:

a step, executed between the steps of cutting and positioning, of polishing each of the optical parts so that each of the divided gradient index rod lenses has a predetermined length.

15. A method of producing an optical device according to claim 3, wherein the predetermined positional relationship is such that the reference planes of the divided substrates are parallel to each other.

16. A method of producing an optical device according to claim 15, wherein the predetermined positional relationship is such that the reference planes of the divided substrates are flush with each other.

17. A method of producing an optical device according to claim 3, wherein the substrate has at least one groove, formed in the surface of the substrate, for receiving the gradient index rod lens.

* * * * *